UNITED STATES PATENT OFFICE 2,083,888

PRODUCTION OF DYESTUFFS OF THE TRIARYLMETHANE SERIES

Carl Winter and Paul Krebs, Ludwigshafen-on-the-Rhine, Germany, assignors to General Aniline Works, Inc., New York, N. Y., a corporation of Delaware No Drawing. Application May 27, 1935, Serial No. 23,792. In Germany June 6, 1934

7 Claims. (Cl. 260—67)

The present invention relates to dyestuffs of the triarylmethane series and a process of producing same.

We have found that new dyestuffs of the triarylmethane series distinguished by excellent tinctorial properties can be obtained by employing in the preparation of the dyestuffs aryl-amino-3-propionitriles or their substitution or saponification products, the nitrile groups present in the resulting dyestuffs being wholly or partly saponified if desired. The arylamino-3-propionitriles serving as starting materials according to this invention may be obtained for example according to the U. S. Patent No. 1,992,615 by adding primary or secondary aromatic amines to acrylic acid nitrile.

The dyestuffs may be prepared, for example, by condensing a nitrile corresponding to the general formula

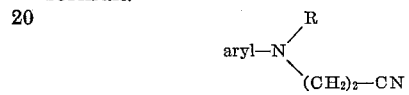

in which R stands for hydrogen or an alkyl, hydroxyalkyl or aralkyl group, or substitution or saponification products thereof with an aromatic aldehyde or a substitution product thereof or by condensing a compound of the said constitution with 4,4'-(N,N') - tetraalkyldiamino - benzhydrol or with 4,4'-(N,N')-tetraalkyldiaminobenzophenones or with 4,4'-(N,N'-dialkyl-N,N'-diaralkyl)-diaminodiarylmethane having a sulphonic acid group in each of the aralkyl groups or by condensing a secondary or tertiary aromatic amine with a 4,4'-(N,N'-di-cyanethyl-N,N'-di-sulphoaralkyl)-diaminodiarylmethane.

According to this invention both basic and acid triarylmethane dyestuffs containing the group—$(CH_2)_2$—CN one or more times may be prepared. Generally speaking the shade of color of these dyestuffs is more reddish than that of the corresponding dyestuffs without the group—$(CH_2)_2$—CN. Moreover in the case of the acid dyestuffs the solubility is usually considerably augmented.

The following examples will further illustrate how the said invention may be carried out in practice but the invention is not restricted to these examples. The parts are by weight.

Example 1

For the preparation of a basic dyestuff 32.4 parts of 4,4'-tetra-ethyldiaminobenzophenone and 21.6 parts of alpha-naphthylamino-3-propionitrile (obtainable from alpha-naphthylamine and acrylic acid nitrile) are heated at 85° C. in the presence of toluene as a diluent and with an addition of 16.4 parts of phosphorus oxychloride until the condensation is completed. The reaction mixture is then poured into water, the toluene expelled by steam distillation and the dyestuff separated from the acid solution by nearly neutralizing it with caustic soda solution. The dyestuff is boiled with water, the resinous constituents are separated and the dyestuff precipitated by the addition of common salt. A dyestuff readily soluble in water is obtained which yields pure blue shades on paper, cotton mordanted with tannic acid and silk.

Example 2

For the preparation of dyestuffs of the type of Formyl Violet S4B (see Schultz, Farbstofftabellen, 7th edition, volume 1, No. 806).

(a) 582 parts of N-ethyl-N-benzylaniline sulfonic acid are condensed with 100 parts of 30 per cent formaldehyde in a solution slightly acid to congo to form in known manner diethyldibenzyldiaminodiphenylmethane disulfonic acid. 594 parts of the resulting disulfonic acid with 174 parts of N-ethyl-N-phenylamino-3-propionitrile (obtainable from monoethylaniline and acrylic acid nitrile) are oxidized by means of potassium bichromate and sulfuric acid.

The resulting dyestuff yields reddish violet shades on wool and silk from acid baths.

In an analogous manner valuable dyestuffs for wool and silk may be obtained from the said disulfonic acid and phenylamino-3-propionitrile (obtainable from aniline and acrylic acid nitrile), N - 2'-methylphenlyamino-3 - propionitrile (obtainable from ortho-toluidine and acrylic acid nitrile), N-ethyl-N-(3'-methylphenyl)-amino-3-propionitrile (obtainable from 3-methyl-N-ethylaniline and acrylic acid nitrile) or N-hydroxyethyl-N-phenylamino-3-propionitrile (obtainable from hydroxy-ethylaniline and acrylic acid nitrile).

(b) 80.1 parts of N-benzyl-N-phenylamino-3-propionitrile monosulfonic acid sodium salt (obtainable by the treatment of N-benzyl-N-phenyl-amino-3-propionitrile dissolved in concentrated sulfuric acid at 20° C. with fuming sulfuric acid containing 70 per cent of $SO_3$ until a sample withdrawn dissolves in sodium carbonate solution giving a clear solution, and neutralization of the resulting sulfonic acid with caustic soda solution) dissolved in 1200 parts of water are heated for three hours at 100° C. with 13 parts of 30 per cent formaldehyde in the presence of 25 parts of 10 per cent sulfuric acid. The solution is then diluted with water to 3000 parts, rendered neutral to litmus with caustic soda solution and mixed with 17.6 parts of diethylaniline, 29.4 parts of potassium bichromate and 12 parts of sulfuric acid of 66° Baumé strength. The reaction mixture is stirred for 24 hours at 35° C. and, when the oxidation is completed, filtered by suction. The filtrate is evaporated to about one third of its original volume and the dyestuff is precipitated by the addition of 200 parts of magnesium sulfate. The dyestuff dyes wool and silk reddish violet shades from acid baths.

If the diethylaniline be replaced by the equivalent amount (25 parts) of ethylbenzylaniline, the procedure being as described except that the dyestuff is separated by the addition of 300 parts of sodium sulfate (instead of magnesium sulfate), a dyestuff having similar properties is obtained.

*Example 3*

For the preparation of a dyestuff of the type of Patent Blue (cf. Schultz, Farbstofftabellen, 1931, volume 1, No. 826 et seq.).

A solution of 51.5 parts of benzaldehyde-orthosulfonic acid (72.25 per cent) in 250 parts of water is heated for 24 hours while stirring at 100° C. with 76 parts of N-hydroxyethyl-N-phenylamino-3-propionitrile (obtainable from hydroxyethylaniline and acrylic acid nitrile) in a solution just acid to congo. The resulting compound is then separated by the addition of 70 parts of sodium sulfate and then dissolved in 2000 parts of water. At 20° C. there are added to the solution 48 parts of 100 per cent acetic acid and then 47.8 parts of 100 per cent lead dioxide. When the oxidation is completed, 28 parts of sodium sulfate are added to remove the lead salts. Filtration is then effected and the dyestuff precipitated from the filtrate at 45° C. by the addition of 600 parts of sodium sulfate. 100 parts of the resulting dyestuff are heated at 100° C. for four hours in 200 parts of 70 per cent sulfuric acid for the saponification of the nitrile groups. The whole is then allowed to cool to 20° C. and the solution is introduced into 1000 parts of water. 300 parts of 34.5 per cent caustic soda solution are added and the whole worked up in the usual manner. While the unsaponified dyestuff, similarly to a tetrasulfonic acid, can only be incompletely precipitated as an alumina color lake, its saponification product yields when laked a color lake having very great color strength, the waste waters being quite pale.

*Example 4*

For the preparation of a dyestuff of the type of Xylene Blue (cf. Schultz, Farbstofftabellen, 1931, volume 1, No. 826 et seq.).

87 parts of ethylphenylaminopropionitrile are heated at 140° C. for four hours with 174 parts of 70 per cent sulfuric acid, the whole then being poured into 1000 parts of water and rendered alkaline with 200 parts of anhydrous sodium carbonate. By heating to boiling for some time the ammonia formed by the saponification of the nitrile groups is expelled and the solution is concentrated to about 500 parts. The solution is then made slightly mineral acid with a little sulfuric acid. About 500 parts of alcohol are added, deposited sodium sulfate removed by filtration and the solution evaporated to dryness on a waterbath. Ethylphenylaminopropionic acid is obtained in a theoretical yield.

96.5 parts of ethylphenylaminopropionic acid, 200 parts of water and 66.5 parts of 100 per cent benzaldehyde-2.4-disulfonic acid are heated at 100° C. for 24 hours in a slightly mineral acid solution. By dilution with 500 parts of water, the resulting compound is separated for the most part in the form of a white micro-crystalline powder which is filtered off by suction and dried. The remainder of the compound may be recovered from the filtrate by concentration.

63.4 parts of the said compound are dissolved with 10.5 parts of sodium carbonate in 1000 parts of water and oxidized with 102 parts of 30 per cent acetic acid and 23.9 parts of 100 per cent lead dioxide at 20° C. When the oxidation is completed the lead is precipitated in the form of lead sulfate by the addition of 15 parts of sodium sulfate and then filtered. The resulting solution of the dyestuff is either evaporated to dryness or treated with an amount of sodium sulfate sufficient to precipitate the dyestuff. The resulting dyestuff has the valuable property of yielding very clear blue alumina lakes.

*Example 5*

A mixture of 27 parts of 4,4'-(N,N')-tetramethyl-diamino-benzhydrol, 33.8 parts of (N)phenylbenzylaminopropionic acid nitrile sulphonic acid sodium salt having the formula

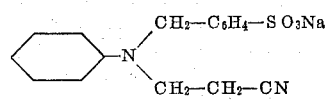

and 98 parts of 10 per cent sulfuric acid is heated at 100° C., while stirring, for about four hours. After cooling, the liquid is poured off and the remaining mass introduced into 1000 parts of water. It is dissolved by adding 11 parts of sodium carbonate. The clear solution is then diluted with another 1000 parts of water and oxidized while stirring vigorously by adding 98 parts of a 6.8 per cent aqueous solution of potassium bichromate, 158 parts of a 10 per cent aqueous solution of oxalic acid and 140 parts of 30 per cent acetic acid. When the oxidation is completed, the solution is heated to 60° C. and the dyestuff precipitated by means of common salt. It is a bronze-like mass which dyes wool, silk and paper blue-violet shades. It may also be employed for coloring lacquers, waxes and artificial masses.

*Example 6*

A mixture of 98 parts of the sodium salt of the sulfonic acid of (benzylphenyl)-aminopropionitrile, 20.5 parts of parachlorbenzaldehyde and 143 parts of 10 per cent sulfuric acid is heated at 105° C. under reflux while stirring for several hours. When the reaction is completed, 1100 parts of water are added. The resulting clear solution is stirred at 20° C. with 97 parts of a 35.8 per cent lead dioxide paste and 27 parts of glacial acetic acid until the formation of the dyestuff is completed. Then, 21 parts of sodium sulfate are added and the lead sulfate formed filtered off. The dyestuff is recovered from the filtrate by evaporation. It corresponds to the formula

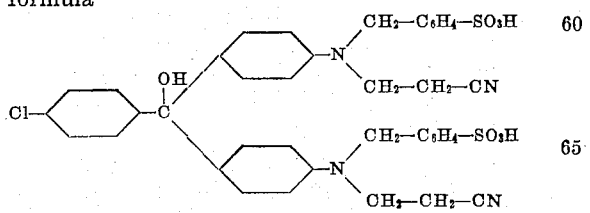

and is a green powder which is readily soluble in water and gives yellowish green shades of color. It may also be employed for the preparation of other dyestuffs as, for example, acid violet dyestuffs by exchanging the chlorine atom for aromatic amines.

What we claim is:

1. Dyestuffs of the triaryl methane series corresponding to the general formula:

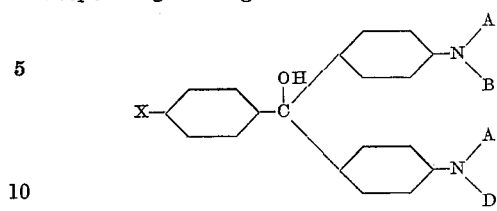

wherein A is selected from the group consisting of hydrogen, alkyl and aralkyl, B is selected from the group consisting of —CH₂CH₂CN, CH₂CH₂COOH and aralkyl, D is selected from the group consisting of hydrogen, —CH₂CH₂CN, —CH₂CH₂COOH and aralkyl and X is selected from the group consisting of hydrogen, chlorine, sulfonic acid and

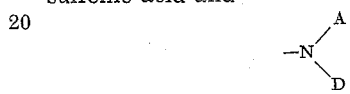

wherein A and D have the same meaning as given above, at least one of the positions marked B and D being substituted by one of the radicles of the group consisting of —CH₂CH₂CN and —CH₂CH₂COOH.

2. Dyestuffs of the triaryl methane series corresponding to the general formula:

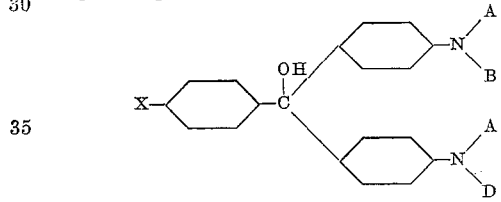

wherein A is selected from the group consisting of hydrogen, alkyl and aralkyl, B is selected from the group consisting of —CH₂CH₂CN, —CH₂CH₂COOH and aralkyl, D is selected from the group consisting of hydrogen, —CH₂CH₂CN, —CH₂CH₂COOH and aralkyl and X is selected from the group consisting of hydrogen, chlorine, sulfonic acid and

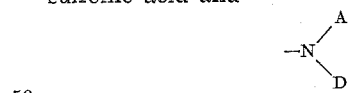

wherein A and D have the same meaning as given above, at least one of the positions marked B and D being substituted by one of the radicles of the group consisting of —CH₂CH₂CN and —CH₂CH₂COOH, which dyestuffs contain up to three sulfonic acid groups.

3. Dyestuffs of the triaryl methane series corresponding to the general formula:

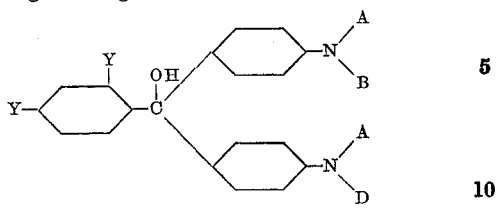

wherein A is selected from the group consisting of hydrogen, alkyl and aralkyl, B is selected from the group consisting of —CH₂CH₂CN, —CH₂CH₂COOH and aralkyl, D is selected from the group consisting of hydrogen, —CH₂CH₂CN, —CH₂CH₂COOH and aralkyl, at least one of the positions marked B and D being substituted by one of the radicles of the group consisting of —CH₂CH₂CN and —CH₂CH₂COOH and at least one Y is a sulfonic acid group and the other Y is hydrogen.

4. Dyestuffs of the triaryl methane series corresponding to the general formula:

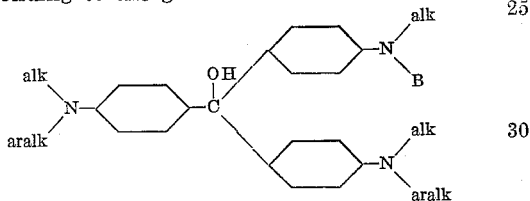

wherein alk stands for an alkyl group containing up to two carbon atoms, B is selected from the group consisting of —CH₂CH₂CN and —CH₂CH₂COOH and aralk stands for an aralkyl group containing a sulfonic acid group.

5. The dyestuff of the triaryl methane series corresponding to the formula

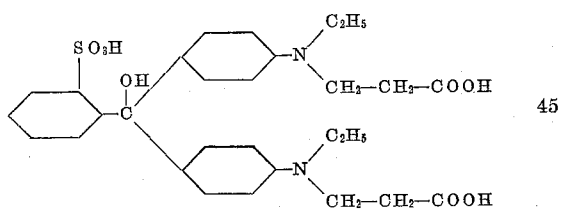

6. The dyestuff of the triaryl methane series corresponding to the formula

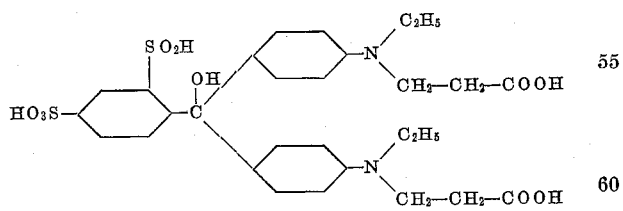

7. The dyestuff of the triaryl methane series corresponding to the formula

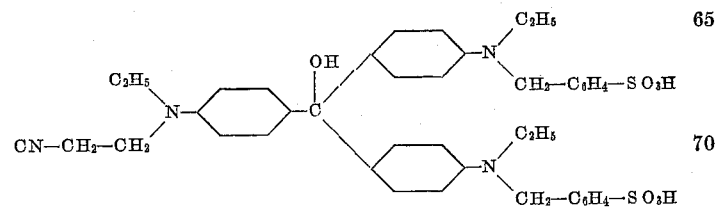

CARL WINTER.
PAUL KREBS.